US010571345B2

(12) United States Patent
Green et al.

(10) Patent No.: US 10,571,345 B2
(45) Date of Patent: Feb. 25, 2020

(54) SYSTEMS AND METHODS FOR DETERMINING THE TEMPERATURE AND/OR LEVEL OF A MOLTEN METAL BATH IN A VESSEL

(71) Applicant: Berry Metal Company, Harmony, PA (US)

(72) Inventors: Edward J. Green, Sewickley, PA (US); Donald E. Yuhas, Aurora, IL (US)

(73) Assignee: BERRY METAL COMPANY, Harmony, PA (US)

( * ) Notice: Subject to any disclaimer, the term of this patent is extended or adjusted under 35 U.S.C. 154(b) by 0 days.

(21) Appl. No.: 16/295,802

(22) Filed: Mar. 7, 2019

(65) Prior Publication Data

US 2019/0277706 A1 Sep. 12, 2019

Related U.S. Application Data

(60) Provisional application No. 62/640,201, filed on Mar. 8, 2018.

(51) Int. Cl.
| | | |
|---|---|---|
| G01K 1/00 | (2006.01) | |
| G01K 11/00 | (2006.01) | |
| G01N 25/00 | (2006.01) | |
| G01K 11/24 | (2006.01) | |
| G01F 23/296 | (2006.01) | |
| C21C 5/46 | (2006.01) | |
| F27D 21/00 | (2006.01) | |
| F27B 3/28 | (2006.01) | |
| F27D 19/00 | (2006.01) | |
| C21C 5/52 | (2006.01) | |

(52) U.S. Cl.
CPC ............ *G01K 11/24* (2013.01); *C21C 5/4673* (2013.01); *F27B 3/28* (2013.01); *F27D 21/0014* (2013.01); *F27D 21/0028* (2013.01); *G01F 23/296* (2013.01); *C21C 2005/5288* (2013.01); *F27D 2019/0003* (2013.01)

(58) Field of Classification Search
USPC .................................. 374/141, 139, 117, 45
See application file for complete search history.

(56) References Cited

FOREIGN PATENT DOCUMENTS

JP 63083626 A * 4/1988

\* cited by examiner

*Primary Examiner* — Mirellys Jagan
(74) *Attorney, Agent, or Firm* — Clark Hill PLC

(57) ABSTRACT

The present invention preferably comprises a system and method for measuring and/or continuously monitoring the temperature and/or height of a molten metal bath in a vessel. Specifically, an ultrasonic transmitter and an ultrasonic receiver are disposed about sides of the vessel and are used to send and receive an ultrasonic signal in order to detect the temperature of the bath. More specifically, the ultrasonic transmitter is configured to send an ultrasonic signal through the vessel, and the ultrasonic receiver is configured to receive that ultrasonic signal after it has travelled through the vessel (comprising the molten metal bath). The ultrasonic receiver provides at least one signal to a processing unit (i.e., control center), which processes the at least one signal to determine the temperature and/or level of the molten metal bath. The invention may further comprise chillers to protect the transmitter and receiver from the heat of the bath.

13 Claims, 4 Drawing Sheets

SYSTEMS AND METHODS FOR DETERMINING THE TEMPERATURE AND/OR LEVEL OF A MOLTEN METAL BATH IN A VESSEL

CROSS REFERENCE TO RELATED APPLICATIONS

This application claims priority to U.S. Provisional Application No. 62/640,201, filed in the United States Patent and Trademark Office on Mar. 8, 2018.

FIELD OF THE INVENTION

The present invention generally relates to vessels for melting metal. More specifically, it relates to systems and methods for measuring the temperature and/or the level of a molten metal bath in such a vessel, preferably using ultrasonic thermometry.

BACKGROUND OF THE INVENTION

In the steel industry, the Basic Oxygen Furnace (BOF) is the primary steelmaking vessel in a steel mill. A general goal in the industry is to improve quality control while also reducing production time and cost. However, a common impedance to being able to achieve that goal is the inability to determine, in real time, the temperature of the molten steel bath inside a BOF. As a result of lacking real time, accurate temperature data, target temperatures and chemistries are often missed. Failure to achieve the target temperatures and chemistries during the metal melting process can result in inefficiencies and may even result in having to reinitiate the heating process, resulting in significant economic impact. This lack of ability to determine temperature in real time results in a lack of efficiency that not only applies to BOF's in the steel industry, but also to electric arc furnaces (EAF's) and induction furnaces.

A BOF operates at very high temperatures. As a result, using temperature sensors inside the BOF to take temperature readings is not typically feasible. Furthermore, to the extent that using temperature sensors inside the BOF has been attempted, the high temperatures at which the BOF operates tend to substantially impact the life of the sensors.

There are a few temperature measuring approaches that have been attempted in the industry and have resulted in at least some measure of success. These approaches include the following: using a bomb thermocouple (i.e., temperature sensor); using a spring loaded thermocouple disposed in the tip of a lance; using an infrared camera to sense the temperature of the tip of a lance or the bath itself; and using a thermocouple installed in a tuyere (i.e., a nozzle which is used to blow oxygen into the molten bath in the BOF). While these approaches do provide for the measurement of temperature, the measurements that are taken are basically just a snapshot—a single temperature measurement taken at a specific point in time. Because the temperature of the molten metal bath in a BOF varies greatly with stratification of the level (height) of the bath and proximity to the heating element, none of these approaches effectively provide accurate temperature data with regard to the overall bath inside the BOF.

SUMMARY OF THE INVENTION

An objective of an embodiment of the present invention is to provide an improved system and method for measuring the temperature of a molten metal bath in a vessel, such as a BOF, EAF, argon oxygen decarburization vessel, degasser, tundish, ladle, crucible, or other furnace.

Another objective of an embodiment of the present invention is to provide a system and method for continuously monitoring the temperature of a molten metal bath in a vessel.

Briefly, a preferred embodiment of the present invention provides a system and method for measuring and monitoring the temperature and/or level (i.e., height) of a molten metal bath in a vessel, such as a BOF, using ultrasonic thermometry. Specifically, an ultrasonic transmitter and an ultrasonic receiver are disposed about the vessel and are used to send and receive an ultrasonic signal in order to detect the temperature and/or level of the molten metal bath in the vessel. More specifically, the ultrasonic transmitter is configured to send an ultrasonic signal through the vessel, and the ultrasonic receiver is configured to receive that ultrasonic signal after it has travelled through the vessel and the molten metal bath in the vessel. Preferably, the ultrasonic receiver is configured to provide at least one signal to a processing unit (such as a control center), and the processing unit is configured to process the at least one signal and determine the temperature and/or level of the molten metal bath. The receiver can be either hard wired to the processing unit, or it can be configured to wirelessly transmit the signals to the processing unit. Regardless, the system can be used to take a single temperature and/or level reading at a certain point in time, or, more preferably, may be used to continuously monitor the temperature and/or level of the molten metal bath over time. Moreover, the control center may be configured to implement changes to the molten metal bath (i.e., by controlling other components of the system), such as by altering the temperature thereof, based on signals received and processed by the control center.

More than one pair of ultrasonic transmitters and receivers can be used in connection with taking measurements relating to the molten metal bath in the vessel. For example, one ultrasonic transmitter/receiver pair can be disposed about the sides of the vessel for determining the temperature of the molten metal bath therein, and another pair can be disposed under the vessel or on the bottom of the vessel for determining the level of the molten metal bath.

A preferred embodiment of the present invention comprises:

a system for determining at least one of a temperature and a level of a molten metal bath in a vessel, the system comprising:

at least one ultrasonic transmitter configured to transmit an at least one ultrasonic signal through the vessel;

at least one ultrasonic receiver configured to receive the ultrasonic signal after the ultrasonic signal has travelled through the vessel; and a processing unit configured to receive at least one signal from the at least one ultrasonic receiver and process the signal to determine at least one of the temperature and the level of the molten metal bath in the vessel.

Another preferred embodiment of the present invention comprises:

a method of determining at least one of a temperature and a level of a molten metal bath in a vessel, the method comprising:

using at least one ultrasonic transmitter to transmit an at least one ultrasonic signal through the vessel;

using at least one ultrasonic receiver to receive said ultrasonic signal after the ultrasonic signal has travelled through the vessel; and using a processing unit to receive at least one signal from the at least one ultrasonic receiver and process the signal to determine at least one of the temperature and the level of the molten metal bath in the vessel.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE EMBODIMENTS

Figure 1:
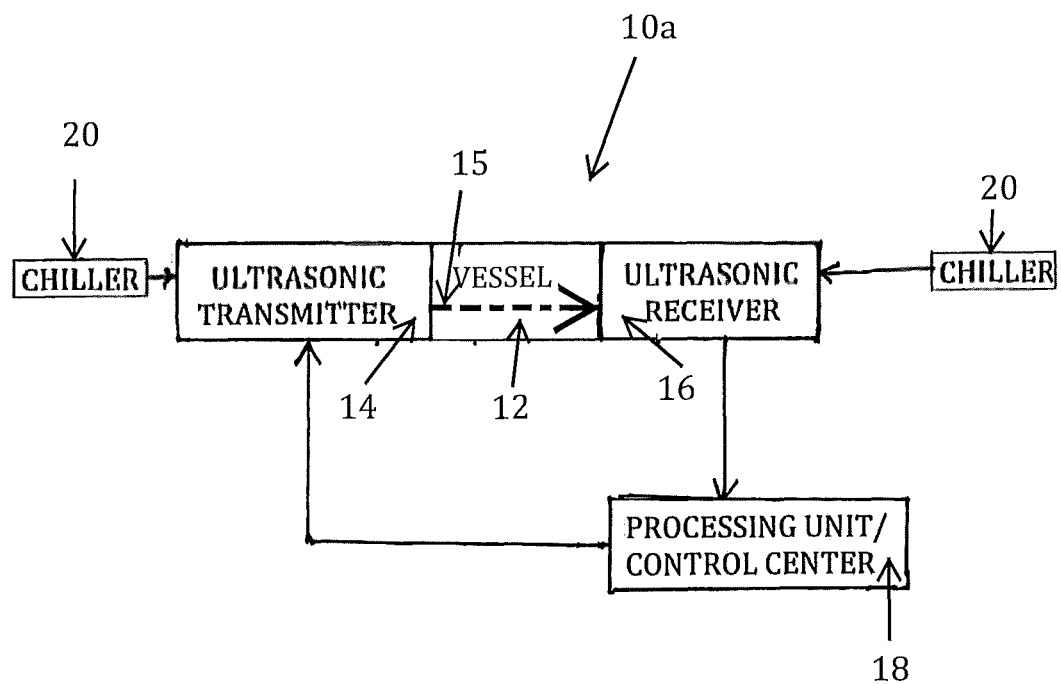
FIG. 1 is a block diagram of a system provided in accordance with a first embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 is a block diagram of a system 10a provided in accordance with a first embodiment of the present invention. As shown, the system 10a comprises a vessel 12, such as a BOF, for use in a metal making process. The vessel 12 may comprise multiple layers of refractory material, such as fire brick, alumina, silica, etc., as well as one or more internal insulating layers, such as gunite or other shotcrete material. Regardless of the exact structure of the vessel 12, during the metal making process, the vessel 12 contains a molten metal bath that is thermally processed as is customary in the industry.

As shown in FIG. 1, the system 10a provides that both an ultrasonic transmitter 14 and an ultrasonic receiver 16 are disposed about the vessel 12. Both the ultrasonic transmitter 14 and the ultrasonic receiver 16 can either be disposed directly on the vessel 12, or they can be spaced away therefrom in order to effectively insulate them with regard to the high operating temperatures of the vessel 12. The ultrasonic transmitter 14 is configured to send an ultrasonic signal (represented in FIG. 1 using dashed line 15), and the ultrasonic receiver 16 is configured to receive that ultrasonic signal after the ultrasonic signal has travelled through the vessel 12 and the molten metal bath in the vessel 12. Preferably, the ultrasonic transmitter 14 and ultrasonic receiver 16 are on approximately opposite sides of the vessel 12 to get the longest path of the ultrasonic signal through the vessel, and in order to obtain the most accurate signal. If the molten metal bath has carbon electrodes, oxygen lances, or other obstructions located in the bath, the ultrasonic transmitter 14 and ultrasonic receiver 16 can be aligned off-center and/or at other orientations about the vessel with accuracy being only nominally affected.

The aforementioned method of signal transmission may be referred to as a "pitch-catch" method comprising transmission of a signal from one side of the vessel that is received on the other side of the vessel.

Regardless of the exact positioning of the ultrasonic transmitter 14 and ultrasonic receiver 16, preferably, the ultrasonic receiver 16 is configured to provide at least one signal to a processing unit (such as a control center) 18, and the processing unit 18 is configured to process that at least one signal and determine the temperature of the molten metal bath inside the vessel 12. The ultrasonic receiver 16 can be either hard wired to the processing unit 18, or it can be configured to wirelessly transmit the at least one signal to the processing unit 18. Regardless, the system 10a can be used to take a single temperature reading at a certain point in time, or, more preferably, may be used to continuously monitor the temperature of the molten metal bath in the vessel 12 over time.

The molten metal bath is effectively dynamic, and the ultrasonic sound waves 15 emitted by the ultrasonic transmitter 14 change speed as the density of the molten metal bath in the vessel 12 changes with temperature. Specifically, the ultrasonic waves 15 travel through the molten metal bath at different speeds depending on the density of the bath. The ultrasonic signal 15 passes through slag, the molten metal bath, as well as the many layers associated with the vessel 12 itself, before ultimately being received by the ultrasonic receiver 16. The slag may comprise solidified steel, iron, silicates, and oxides. The slag may also be somewhat porous due to frozen air bubbles. The processing unit 18 is configured to receive the at least one signal from the ultrasonic receiver 16, and depending on the characteristics of the at least one signal, determine the temperature of the molten metal bath in the vessel 12.

Generally speaking, ultrasonic thermometry is based on the thermal dependence of the speed of sound in materials. Sound recorded through a material inherently contains information about the temperatures within that material. Ultrasonic thermometry is unique in that it is the only heat flux measurement technology that passively measures heat flux without disrupting flow or thermal transport. Ultrasonic technology maintains a constant accuracy over the entire temperature range and measures at the speed of sound.

As further shown in FIG. 1, one or more chillers 20 can be utilized in connection with the ultrasonic transmitter 14 and the ultrasonic receiver 16 as a means to effectively reduce the temperature of each during the overall process. With regard to the exact structure and operation of the chillers 20, each can take many different forms. For example, each may take the form of a chill plate or housing that may or may not be cooled with water, air, or some other appropriate coolant. As shown, the processing unit (i.e., control center) 18 is preferably also effectively connected to the ultrasonic transmitter 14 such that the control center 18 can be used to control the overall process of when to send an ultrasonic signal 15 (i.e., using the ultrasonic transmitter 14) and when to receive same (i.e., using the ultrasonic receiver 16). Although not specifically shown, the control center 18 can be connected to many other components involved in the process, such as the chillers 20 and/or other components (not shown) which are used in connection with processing metal in the vessel 12. For example, the control center 18 can be connected to heating element(s) and can control the amount of heat being applied and when to apply the heat with regard to the vessel 12, etc. Moreover, the control center 18 may be configured to implement changes to the molten metal bath (i.e., by controlling other components of the system), such as by altering the temperature thereof, based on signals received and processed by the control center.

Figure 2:
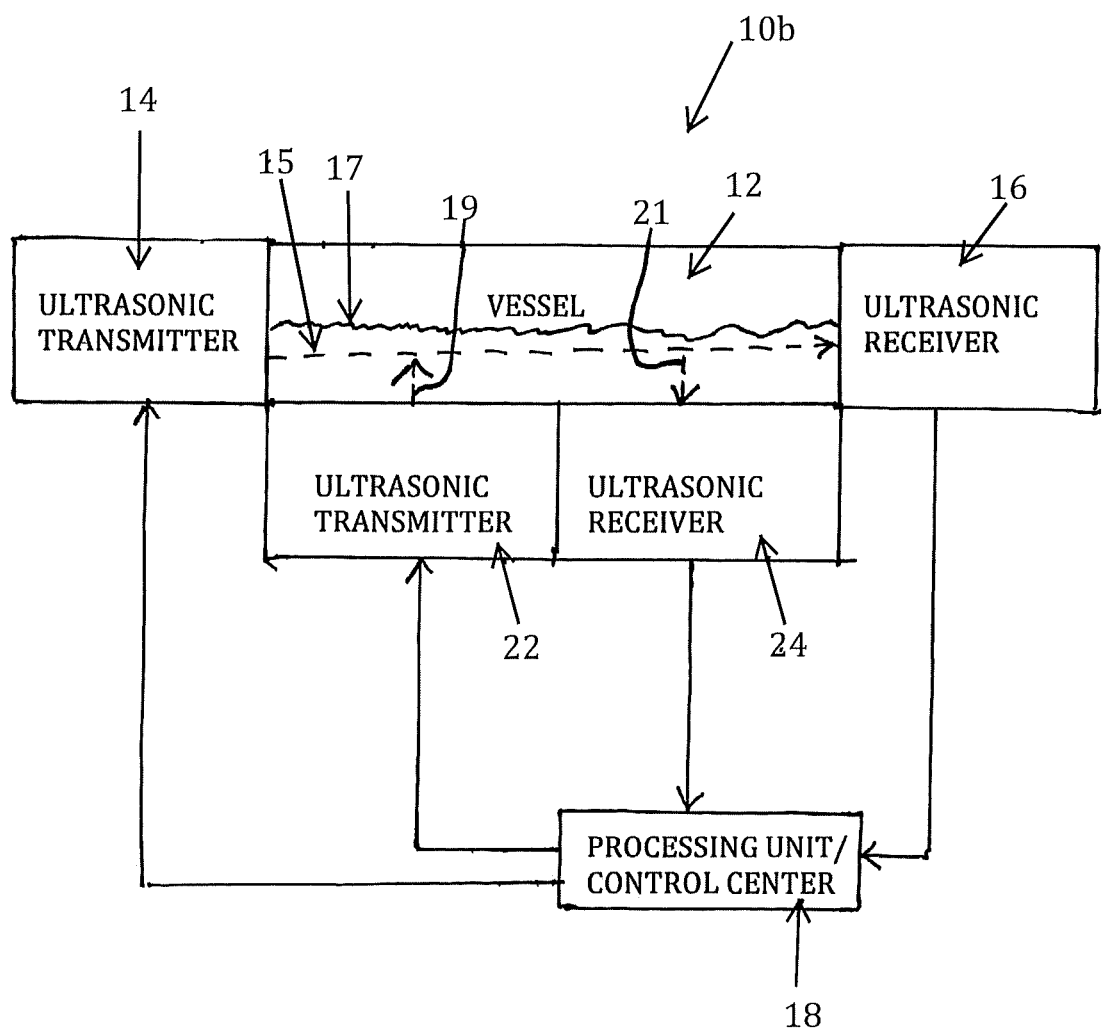
FIG. 2 is a block diagram of a system provided in accordance with a second embodiment of the present invention.

FIG. 2 is a block diagram of a system 10b which is in accordance with a second embodiment of the present invention. The system 10b is like the system 10a shown in FIG. 1, and includes an ultrasonic transmitter 14, ultrasonic receiver 16, and a processing unit (i.e., control center) 18, wherein an ultrasonic signal (represented using a dashed line which is identified using reference numeral 15). However, in addition, the system 10b shown in FIG. 2 employs an additional ultrasonic transmitter 22 and receiver 24. The additional ultrasonic transmitter 22 and receiver 24 are disposed under the vessel 12 or on the bottom of the vessel 12, and are used by the processing unit 18 to determine the level (i.e., height) of the molten metal bath in the vessel 12 (in FIG. 2, the height of the molten metal bath is indicated using reference numeral 17). Specifically, preferably the ultrasonic transmitter 22 and ultrasonic receiver 24 are in close proximity to each other, and the ultrasonic transmitter 22 sends an ultrasonic signal vertically upward (represented in FIG. 2 using dashed line 19). The signal travels through all the layers of the vessel 12, the slag, and the molten metal bath, and when the signal reaches the top of the bath, a large portion of the ultrasonic signal (represented in FIG. 2 using dashed line 21) is reflected back to the ultrasonic receiver 24 located proximate to the bottom of the vessel 12. By knowing the temperature of the molten metal bath using the ultrasonic transmitter 14 and receiver 16 located about the sides of the vessel 12, the processing unit 18 can use the ultrasonic transmitter 22 and receiver 24 located about the bottom of the vessel 12 to calculate the level of the molten metal bath in the vessel 12.

Although not shown in FIG. 2, one or more chillers 20 (such as chill plates, housing, etc., as previously described) can be employed in connection with each ultrasonic transmitter 14, 22 and receiver 16, 24 depicted in FIG. 2, as has been described in connection with FIG. 1.

While FIG. 2 shows one set of ultrasonic transmitters and receivers (14 and 16, respectively) being used about the sides of the vessel 12 to determine the temperature of the molten metal bath in the vessel 12, and another set of ultrasonic transmitters and receivers (22 and 24, respectively) being used about the bottom of the vessel 12 to determine the level of the molten metal bath in the vessel 12, either set can be used without using the other, and a given ultrasonic transmitter 14, 22 and receiver 16, 24 can be placed at a different location than is depicted in either FIG. 1 or 2, while still staying very much within the scope of the present invention.

Figure 3B:
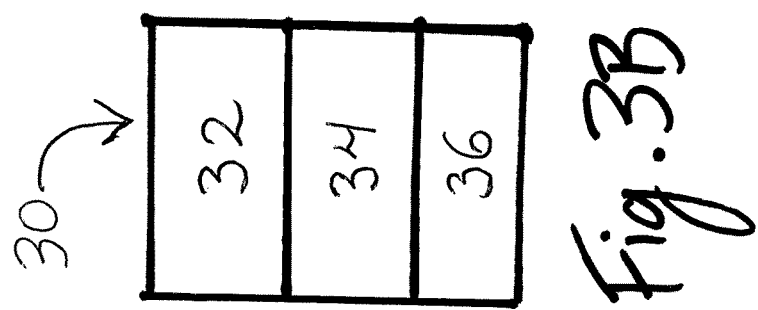
FIG. 3B is a block diagram of a module comprising the system depicted in FIG. 3A.
Figure 3A:
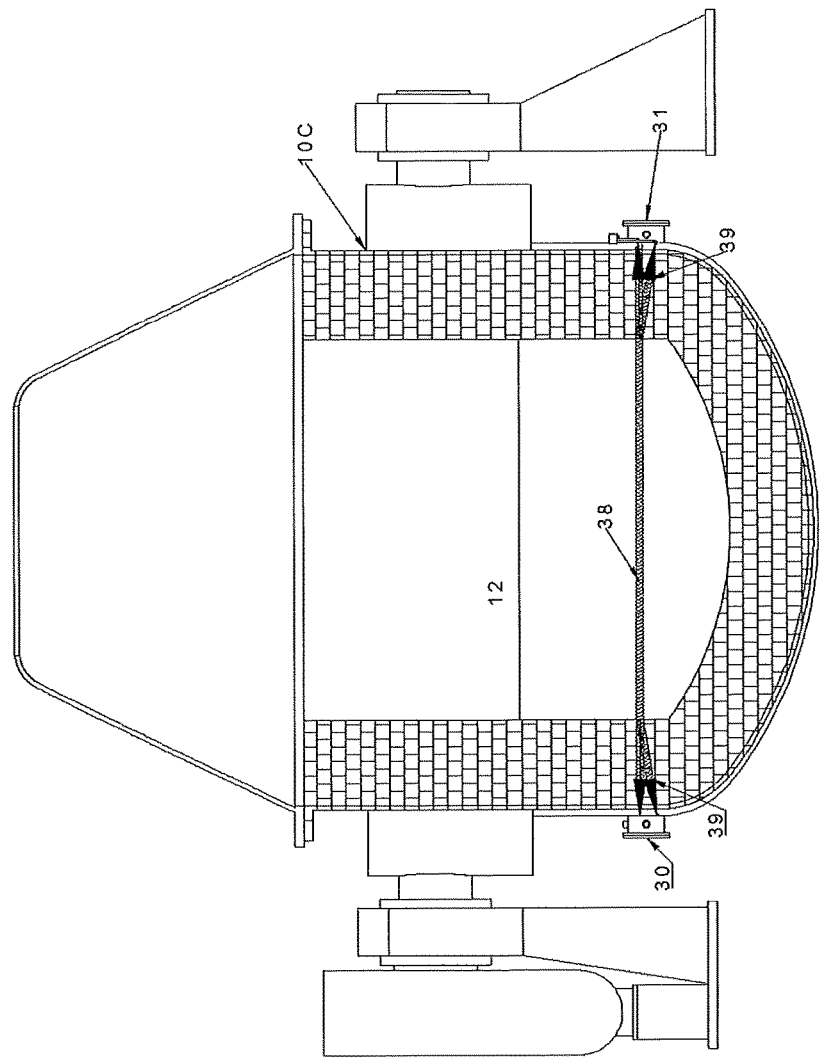
FIG. 3A is an illustration of a system provided in accordance with a third embodiment of the present invention.

FIG. 3A shows an illustration of a system 10c which is in accordance with a third embodiment of the present invention. The system 10c is like the system 10a, and 10b shown in FIGS. 1 and 2, respectively, except that system 10c comprises first and second sensor modules 30, 31. As shown in FIG. 3B each sensor module 30, 31 (only module 30 is shown) comprises at least one ultrasonic transmitter 32, at least one ultrasonic receiver 34, and a chiller 36. The modules 30, 31 are preferably protected from the heat of the bath by a chiller 36, which may or may not be cooled with water, air, or some other appropriate coolant.

FIG. 3A shows a "pulse-echo" method of signal transmission in the system 10c, which enables self-calibration of the methods for determining the temperature and/or level of a molten metal bath in a vessel 12, as described herein. This method calculates the thickness of the walls of the vessel 12 and is used to determine the change in wall thickness for the purpose of self-calibration. The walls of the vessel 12 are known to build a slag layer between each use of the vessel 12 and can grow in thickness substantially. The refractory material in the walls is also know to erode from the molten metal and can become substantially thinner over time. This ever changing wall thickness would cause great difficulty in accurately calculating time divided by distance across the vessel 12 without self-calibration. To enable self-calibration, the pulse-echo method comprises a transmission by one of the modules 30, 31 of a principal signal 38 that traverses the vessel 12 and bounces back (in part) as an echo signal 39 at each junction between materials (i.e., the junction between the bath and slag layer, the junction between the slag layer and the refractory material comprising the wall of the vessel 12, etc.) to the same module 30, 31 from which the principal signal 38 was sent. The principal signal 38 is also received by the module 30, 31 from which the signal 38 did not originate. The modules 30, 31, or additional modules, may also be placed at approximately the bottom of the vessel 12 to detect the height of the bath, wherein the modules are likewise configured for self-calibration based on the pulse-echo method.

Figure 4:
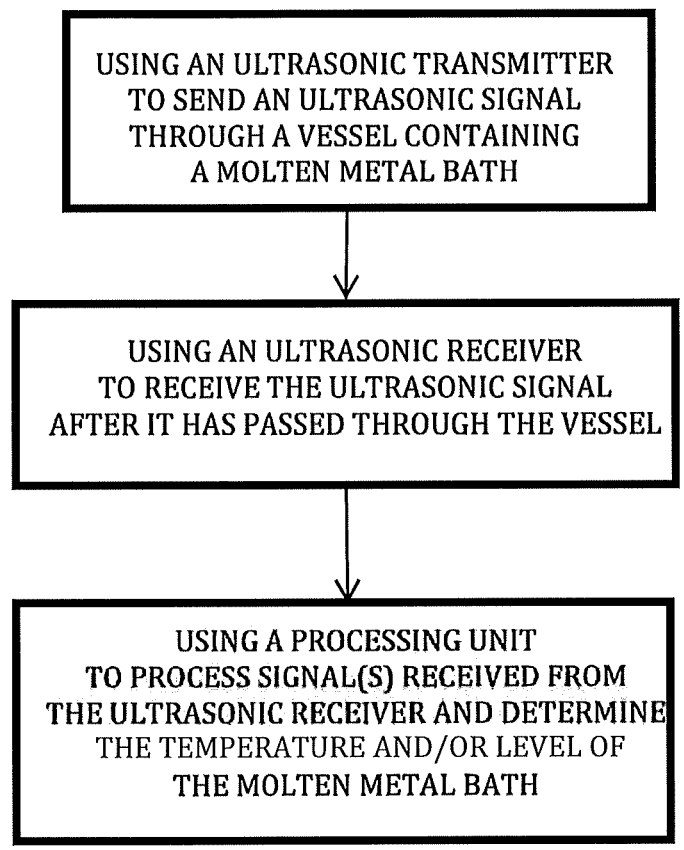
FIG. 4 is block diagram of a method using either one of the systems shown in FIGS. 1 and 2, provided in accordance with an embodiment of the present invention.

FIG. 4 is block diagram of a method using either one of the systems shown in FIGS. 1 and 2, in accordance with an embodiment of the present invention, and is self-explanatory given the description hereinabove.

While specific embodiments of the invention have been shown and described, it is envisioned that those skilled in the art may devise various modifications without departing from the spirit and scope of the present invention. For example, while the present invention was described in connection with a BOF, the present invention can also be used in connection with other devices such as EAF's and induction furnaces.

What is claimed is:

1. A system for determining at least one of a temperature and a level of a molten metal bath in a vessel, the system comprising:
    at least one ultrasonic transmitter configured to transmit an at least one ultrasonic signal through the vessel;
    at least one ultrasonic receiver configured to receive the at least one ultrasonic signal after the at least one ultrasonic signal has travelled through the vessel;
    a processing unit configured to receive at least one signal from the at least one ultrasonic receiver and process the at least one signal to determine at least one of the temperature and the level of the molten metal bath in the vessel; and
    at least one chiller configured to modify a temperature of at least one of the at least one ultrasonic transmitter and the at least one receiver.

2. The system as recited in claim 1, wherein the processing unit is connected to the at least one ultrasonic transmitter and the at least one ultrasonic receiver, and the processing unit is configured to control when the ultrasonic transmitter transmits the at least one ultrasonic signal.

3. The system as recited in claim 1, wherein the at least one ultrasonic transmitter and the at least one ultrasonic receiver are disposed about sides of the vessel, and wherein the processing unit is configured to determine the temperature of the molten metal bath based on the at least one signal which is received from the at least one ultrasonic receiver.

4. The system as recited in claim 1, wherein the at least one ultrasonic transmitter and the at least one ultrasonic receiver are disposed about a bottom of the vessel, and wherein the processing unit is configured to determine the level of the molten metal bath based on the at least one ultrasonic signal which is received from the at least one ultrasonic receiver.

5. The system as recited in claim 1, further comprising first and second ultrasonic transmitters, first and second ultrasonic receivers, and first and second ultrasonic signals, wherein the first ultrasonic transmitter and the first ultrasonic receiver are disposed about sides of the vessel, wherein the second ultrasonic transmitter and the second ultrasonic receiver are disposed about a bottom of the vessel, wherein the processing unit is configured to determine the temperature of the molten metal bath based on the first signal which is received from the first ultrasonic receiver, and wherein the processing unit is configured to determine the level of the molten metal bath based on the second signal which is received from the second ultrasonic receiver.

6. The system as recited in claim 1, wherein the at least one ultrasonic transmitter and the at least one ultrasonic receiver are disposed about opposite sides of the vessel, wherein the at least one ultrasonic receiver is a first ultrasonic receiver, and further comprising a second ultrasonic receiver configured to receive a portion of the at least one ultrasonic signal, wherein the second ultrasonic receiver is located on the same side of the vessel as the first ultrasonic transmitter.

7. The system as recited in claim 1, further comprising at least first and second modules, first and second ultrasonic transmitters, first and second ultrasonic receivers, and first and second chillers, wherein the first module comprises the first ultrasonic transmitter, the first ultrasonic receiver, and the first chiller, wherein the second module comprises the second ultrasonic transmitter, the second ultrasonic receiver, and the second chiller, and wherein the system is configured for self-calibration of the first and second transmitters and the first and second receivers.

8. A method of determining at least one of a temperature and a level of a molten metal bath in a vessel, the method comprising:

using at least one ultrasonic transmitter to transmit an at least one ultrasonic signal through the vessel;
using at least one ultrasonic receiver to receive the at least one ultrasonic signal after the at least one ultrasonic signal has travelled through the vessel;
using a processing unit to receive at least one signal from the at least one ultrasonic receiver and process the at least one signal to determine at least one of the temperature and the level of the molten metal bath in the vessel; and
using a chiller to modify a temperature of at least one of the at least one ultrasonic transmitter and the at least one receiver.

9. The method as recited in claim 8, further comprising using the processing unit to control when the at least one ultrasonic transmitter transmits the at least one ultrasonic signal.

10. The method as recited in claim 8, further comprising using the processing unit to determine the temperature of the molten metal bath based on the at least one signal which is received from the at least one ultrasonic receiver.

11. The method as recited in claim 8, further comprising using the processing unit to determine the level of the molten metal bath based on the at least one signal which is received from the at least one ultrasonic receiver.

12. The method as recited in claim 8, further comprising using the processing unit to determine both the temperature and the level of the molten metal bath based on the at least one signal which is received from the at least one ultrasonic receiver.

13. The method as recited in claim 8, wherein the at least one ultrasonic transmitter and the at least one ultrasonic receiver are disposed about opposite sides of the vessel, wherein the at least one ultrasonic receiver is a first ultrasonic receiver, and further comprising using a second ultrasonic receiver to receive a portion of the ultrasonic signal, wherein the second ultrasonic receiver is located on the same side of the vessel as the first ultrasonic transmitter.

* * * * *